United States Patent
Jang

(10) Patent No.: US 7,481,411 B2
(45) Date of Patent: Jan. 27, 2009

(54) REAR IMPACT SHOCK ABSORBING STRUCTURE FOR FUEL CELL VEHICLE

(75) Inventor: Jin-Han Jang, Hwaseong-si (KR)

(73) Assignee: Kia Motors Corporation, Seoul (KR)

( * ) Notice: Subject to any disclaimer, the term of this patent is extended or adjusted under 35 U.S.C. 154(b) by 26 days.

(21) Appl. No.: 11/647,791

(22) Filed: Dec. 29, 2006

(65) Prior Publication Data

US 2008/0111048 A1 May 15, 2008

(30) Foreign Application Priority Data

Nov. 15, 2006 (KR) ........................ 10-2006-0112541

(51) Int. Cl.
*F16M 13/00* (2006.01)
(52) U.S. Cl. ........................ 248/610; 248/611; 280/833; 280/831
(58) Field of Classification Search ................. 248/610, 248/611, 612, 613, 230.1, 312, 312.1; 280/833, 280/831, 830, 832, 834, 835, 836, 837, 838, 280/839, 784, 124.109; 180/69.4; 267/100, 267/103, 105
See application file for complete search history.

(56) References Cited

U.S. PATENT DOCUMENTS

| | | | | |
|---|---|---|---|---|
| 3,054,622 | A | * | 9/1962 | Davis et al. .................. 280/645 |
| 6,042,071 | A | | 3/2000 | Watanabe et al. |
| 6,257,360 | B1 | * | 7/2001 | Wozniak et al. ............ 180/69.5 |
| 7,017,939 | B2 | * | 3/2006 | Darling, III .................. 280/652 |
| 2006/0033322 | A1 | * | 2/2006 | Suess ......................... 280/830 |

FOREIGN PATENT DOCUMENTS

| | | |
|---|---|---|
| JP | 2000219049 | 8/2000 |
| JP | 2003118402 | 4/2003 |
| JP | 2004114740 | 4/2004 |
| JP | 2004168207 | 6/2004 |
| JP | 2005112112 | 4/2005 |

* cited by examiner

*Primary Examiner*—A. Joseph Wujciak, III
(74) *Attorney, Agent, or Firm*—Morgan, Lewis & Bockius LLP

(57) ABSTRACT

A rear impact shock absorbing structure for a fuel cell vehicle. The shock absorbing structure appropriately absorbs shocks in the event of a rear impact, thus preventing hydrogen storage tanks from colliding with a chassis cross member arranged between the hydrogen storage tanks, therefore preventing the hydrogen storage tanks from being broken or damaged. The shock absorbing structure includes a front tank support for supporting a hydrogen storage tank provided in front of a chassis cross member. A rear tank support supports a hydrogen storage tank provided in back of the chassis cross member. Further, a shock absorbing member connects the front and rear tank supports to each other, and is deformed when shocks are applied to the front and rear tank supports.

2 Claims, 4 Drawing Sheets

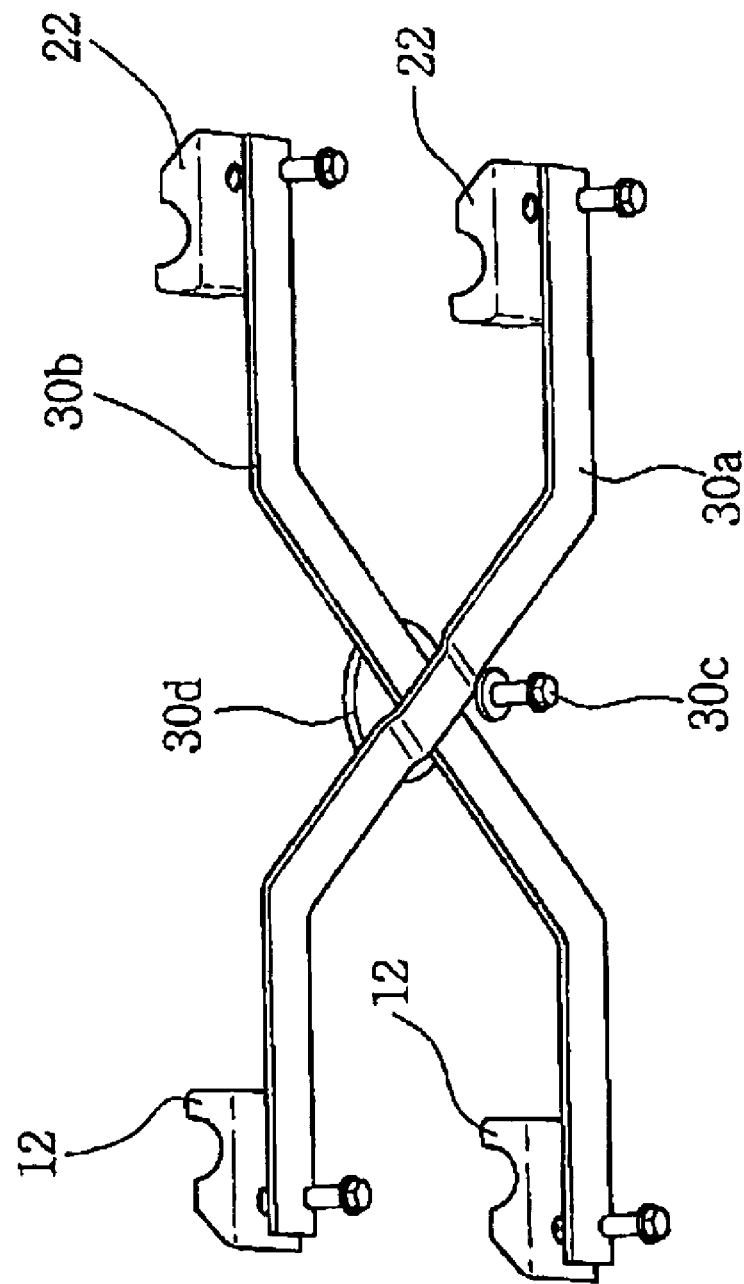

REAR IMPACT SHOCK ABSORBING STRUCTURE FOR FUEL CELL VEHICLE

CROSS-REFERENCE TO RELATED APPLICATIONS

The present application is based on, and claims priority from, Korean Application Serial Number 10-2006-0112541, filed on Nov. 15, 2006, the disclosure of which is hereby incorporated by reference herein in its entirety.

FIELD OF THE INVENTION

The present invention relates to a rear impact shock absorbing structure for a fuel cell vehicle and, more particularly, to a rear impact shock absorbing structure for a fuel cell vehicle, which appropriately deforms a shock absorbing member in the event of a rear impact, thus efficiently absorbing impact energy, therefore preventing a hydrogen storage tank from being broken or damaged.

BACKGROUND OF THE INVENTION

As one of future technologies required for an auto industry, there is an urgent requirement to develop vehicles suitable for responding to global warming, the exhaustion of petroleum resources, the deterioration of the urban air environment, etc., and to realize the use of energy alternatives to petroleum or to save energy, thus achieving high efficiency and reducing environmental pollution.

To satisfy this requirement, the development of a hybrid electric car which is capable of considerably increasing the fuel efficiency of a vehicle, in comparison with a conventional vehicle, has made good progress. The typical hybrid electric car has two power sources, namely an engine and an electric motor. Thus, according to the intended purpose, the hybrid electric car utilizes the engine and the electric motor at optimal efficiency, thus saving energy and reducing pollution.

One example of a hybrid car is a fuel cell vehicle which uses a fuel cell. Such a fuel cell vehicle utilizes a fuel cell system which uses pure hydrogen (generally, purity of 99% or higher) as fuel.

The fuel cell system applied to the fuel cell vehicle includes a plurality of hydrogen storage tanks which are charged with high-pressure hydrogen. A hydrogen supply pipe functions to carry hydrogen gas contained in the hydrogen storage tanks. A magnetic valve is installed between each of the hydrogen storage tanks and the hydrogen supply pipe, and controls the flow of gas through an opening and closing operation. A regulator reduces the pressure of hydrogen gas supplied from the hydrogen supply pipe at a predetermined pressure level. The hydrogen, whose pressure is reduced in the regulator, is supplied to a fuel cell. The fuel cell makes the hydrogen react with oxygen, thus generating electric power. A motor generates driving force using the electric power which is generated by the fuel cell.

The fuel cell vehicle having such a fuel cell system is schematically shown in FIG. 1. As shown in the drawing, a plurality of hydrogen storage tanks 2 is installed in the fuel cell vehicle 1. The hydrogen storage tanks 2 are mounted via bolts to a chassis cross member, which is provided on the lower end of a rear floor.

Specifically, the hydrogen storage tanks 2 include a front hydrogen storage tank 2A, a rear hydrogen storage tank 2C, and a middle hydrogen storage tank 2B. The front hydrogen storage tank 2A is located under a seat which is provided on the rear of the vehicle. The rear hydrogen storage tank 2C is located under a trunk. The middle hydrogen storage tank 2B is located between the front and rear hydrogen storage tanks 2A and 2C. Generally, the middle hydrogen storage tank 2B and the rear hydrogen storage tank 2C are disposed on opposite sides of the chassis cross member 3.

However, the conventional structure has the following problem. That is, in the event of a rear impact, the rear hydrogen storage tank 2C may be moved towards the front of the vehicle due to deformation. In this case, a pointed corner portion of the chassis cross member 3 can collide with the hydrogen storage tanks 2B and 2C, and thus break or damage the tanks, resulting in hydrogen leaking from the tanks, thus causing a serious problem.

SUMMARY OF THE INVENTION

Embodiments of the present invention provide a rear impact shock absorbing structure for a fuel cell vehicle, which appropriately absorbs shocks in the event of a rear impact, thus preventing hydrogen storage tanks from colliding with a chassis cross member arranged between the hydrogen storage tanks, therefore preventing the hydrogen storage tanks from being broken or damaged.

A rear impact shock absorbing structure for a fuel cell according to an exemplary embodiment of the present invention vehicle includes a front tank support for supporting a hydrogen storage tank provided in front of a chassis cross member. A rear tank support supports a hydrogen storage tank provided in back of the chassis cross member. A shock absorbing member connects the front and rear tank supports to each other, and is deformed when shocks are applied to the front and rear tank supports.

Preferably, the shock absorbing member comprises two first and second shock absorbing members which are connected at centers thereof to each other by a bolt to form an X shape. Both ends of each of the first and second shock absorbing members are fastened to a bracket attached to each of the tank supports.

Further, the bolt is a breakaway bolt that breaks when a shock exceeding a predetermined level is applied.

BRIEF DESCRIPTION OF THE DRAWINGS

For a better understanding of the nature and objects of the present invention, reference should be made to the following detailed description with the accompanying drawings, in which:

FIG. 4 is a detailed view illustrating compounds of an exemplary embodiment of the present invention.

EXEMPLARY EMBODIMENT

DETAILED DESCRIPTION OF THE PREFERRED EMBODIMENTS

Figure 1:
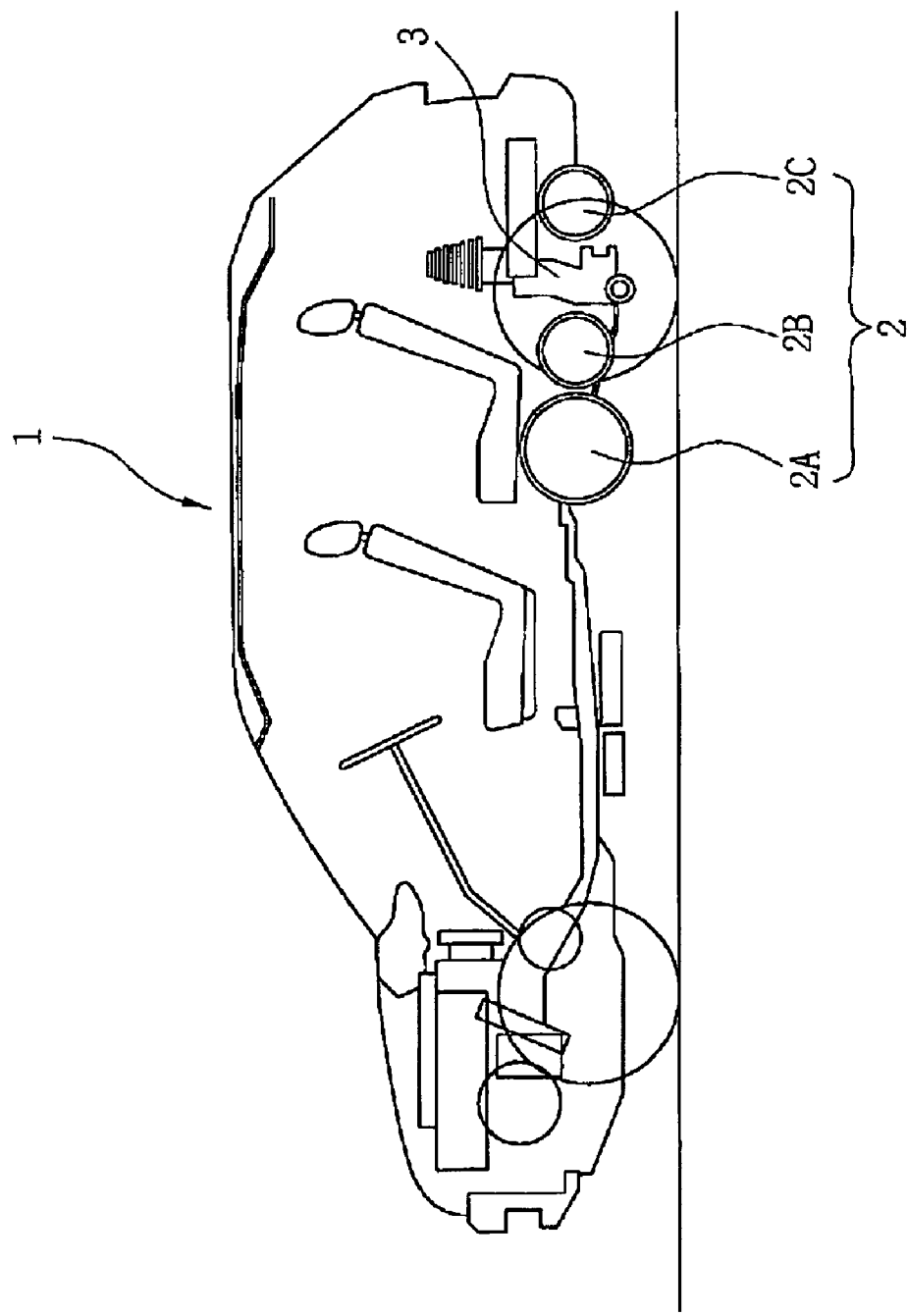
FIG. 1 illustrates the arrangement of hydrogen tanks in a conventional fuel cell vehicle.
Figure 2:
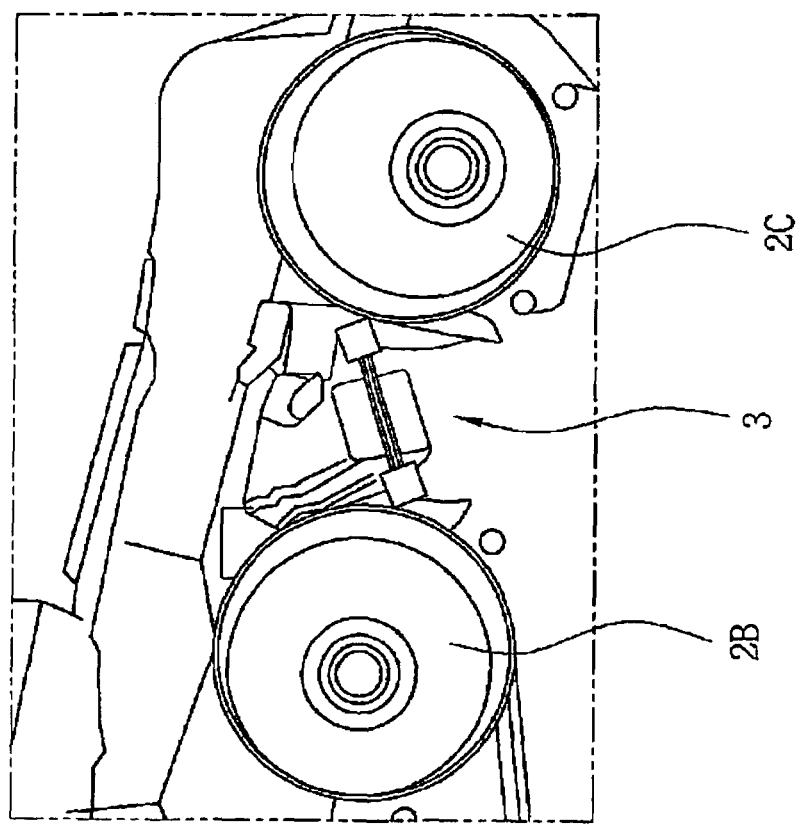
FIG. 2 is a view illustrating the deformation of the conventional fuel cell vehicle, in the event of a rear impact.
Figure 3:
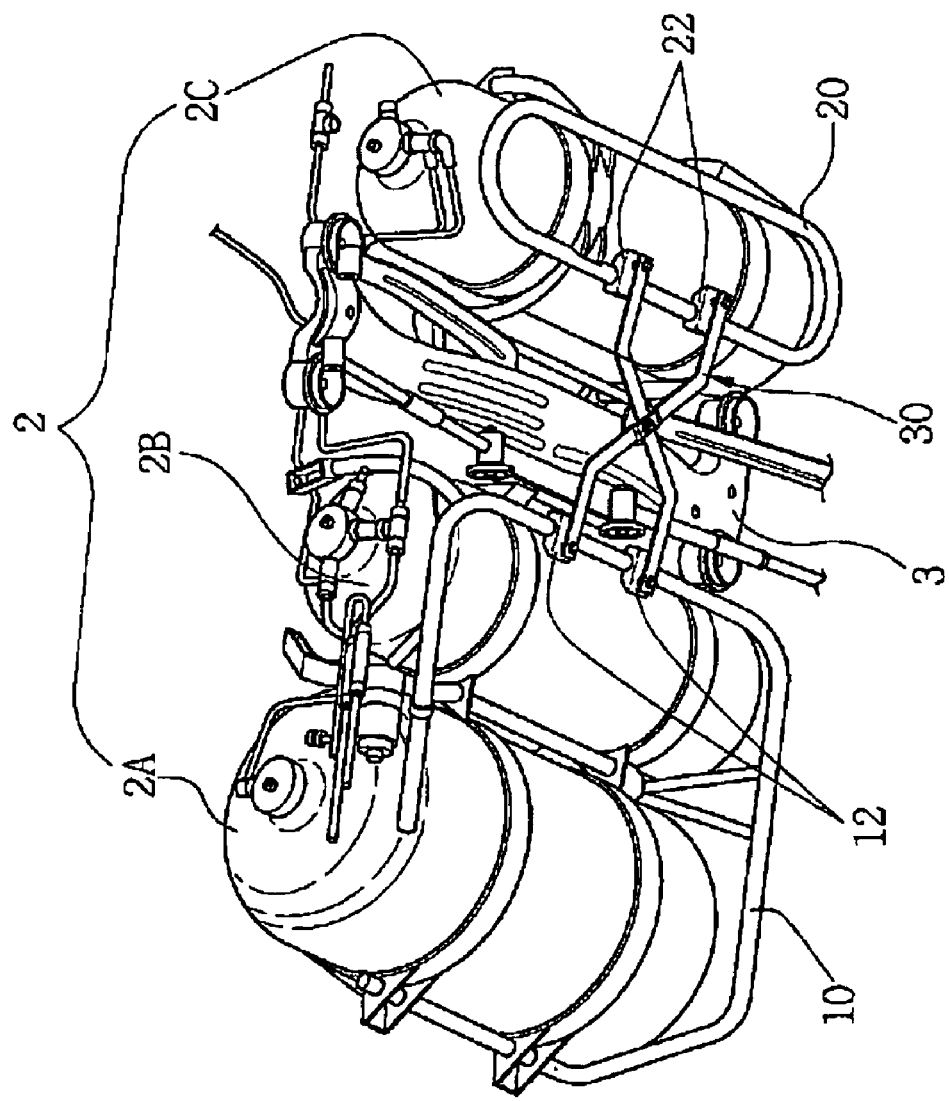
FIG. 3 is a perspective view illustrating a rear impact shock absorbing structure for a fuel cell vehicle, according to an exemplary embodiment of the present invention.

As shown in FIG. 3, several hydrogen storage tanks 2 are arranged in the lengthwise direction of the vehicle. A front hydrogen storage tank 2A and a middle hydrogen storage tank 2B are provided on one side of a chassis cross member 3 and are thus located in the front portion of the vehicle, while a rear hydrogen storage tank 2C is provided on the other side of the chassis cross member 3 and is thus located at the rear portion of the vehicle.

The front hydrogen storage tank 2A and the middle hydrogen storage tank 2B are provided in front of the chassis cross member 3, are supported by a front tank support 10, and are secured to the chassis. The rear hydrogen storage tank 2C is provided in back of the chassis cross member 3, is supported by a rear tank support 20, and is secured to the chassis.

The front tank support 10 is provided with a bracket 12, which is integrally secured to a portion adjacent to the rear tank support 20 through a welding process or another process. The bracket 12 preferably comprises two or more brackets which are spaced apart from each other by a predetermined interval in the widthwise direction of the vehicle.

Further, the rear tank support 20 is provided with a bracket 22, which is integrally secured to a portion adjacent to the front tank support 10 through a welding process or another process and is installed at the same position as the bracket 12 of the front tank support 10 in the widthwise direction of the vehicle. Similar to the bracket 12, the bracket 22 comprises two or more brackets which are spaced apart from each other by a predetermined interval in the widthwise direction of the vehicle.

The brackets 12 of the front tank support 10 and the brackets 22 of the rear tank support 20 are connected to each other via an X-shaped shock absorbing means 30. As shown in FIG. 4 in detail, the shock absorbing means 30 has the X shape, and is provided with two first and second shock absorbing members 30a and 30b, which are connected to each other via a breakaway bolt 30c. Both ends of each shock absorbing member 30a or 30b are secured to the brackets 12 and 22 using bolts.

In order to afford easy fastening operation of the bolt and increase the fastening strength of the bolt when the first and second shock absorbing members 30a and 30b are connected to each other by the bolt 30c, the first and second shock absorbing members 30a and 30b are fastened to each other using the bolt via two upper and lower flanges 30d. Each flange 30d has a circular shape, but may have other shapes without being limited to the circular shape.

Thus, in the event of the rear impact, the rear hydrogen storage tank 2C and the rear tank support 20 supporting the rear hydrogen storage tank 2C are moved towards the front of the vehicle by the deformation. In this case, the shock is also applied to the first and second shock absorbing members 30a and 30b which connect the rear tank support 20 to the front tank support 10. When the shock exceeds a predetermined level, the breakaway bolt 30c breaks, thus absorbing the shocks.

As such, when the bolt breaks, the two shock absorbing members 30a and 30b are separated from each other. When shocks are further applied, each of the first and second shock absorbing members 30a and 30b is deformed and bends downwards, thus secondarily absorbing the shocks. Thereby, the shocks are reduced.

Therefore, in the event of a rear impact, the shock absorbing members are appropriately deformed in two ways, thus efficiently absorbing impact energy and reducing the impact energy. Hence, the hydrogen storage tanks 2 can be more reliably protected.

As apparent from the foregoing, there is an advantage in the present invention in that a rear impact shock absorbing structure for a fuel cell vehicle connects tank supports for supporting front and rear hydrogen storage tanks to each other via shock absorbing members, so that the shock absorbing members efficiently absorb impact energy in the event of rear impact, and thus reduce the impact energy, therefore preventing the hydrogen storage tanks from being damaged and securing the safety of passengers.

What is claimed is:

1. A rear impact shock absorbing structure for a fuel cell vehicle, comprising:
   a front tank support for supporting a hydrogen storage tank provided in front of a chassis cross member;
   a rear tank support for supporting a hydrogen storage tank provided in back of the chassis cross member; and
   a shock absorbing member for connecting the front and rear tank supports to each other, and deformed when shock is applied to the front and rear tank supports;
   wherein said shock absorbing member comprises two first and second shock absorbing members which are connected at centers thereof to each other by a bolt to form an X shape, both ends of each of the first and second shock absorbing members being fastened to a bracket attached to each of the tank supports.

2. The rear impact shock absorbing structure as defined in claim 1, wherein said bolt is a breakaway bolt that breaks when a shock exceeding a predetermined level is applied.

* * * * *